C. D. O'CONNOR.
NUT LOCK.
APPLICATION FILED JULY 21, 1913.
1,099,510.
Patented June 9, 1914.
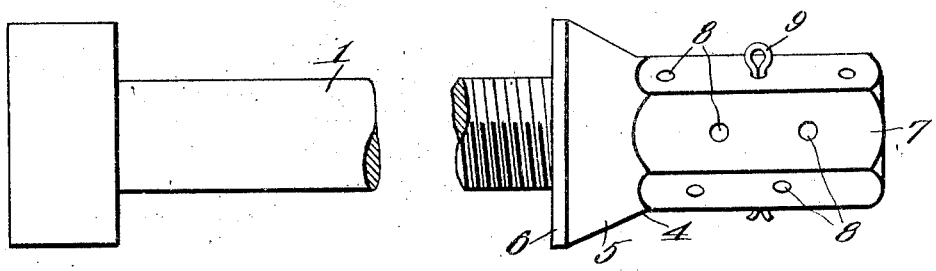
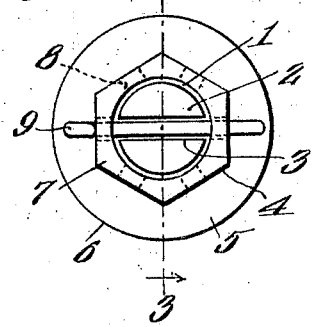
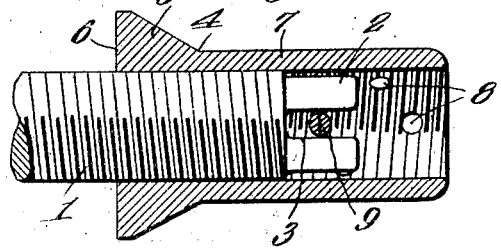
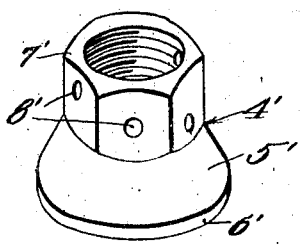
Witnesses
C. D. O'Connor,
Inventor
by C. A. Snow & Co.
Attorneys

UNITED STATES PATENT OFFICE.

CHRISTOPHER D. O'CONNOR, OF TROJAN, SOUTH DAKOTA.

NUT-LOCK.

1,099,510.  Specification of Letters Patent.  Patented June 9, 1914.

Application filed July 21, 1913. Serial No. 780,297.

*To all whom it may concern:*

Be it known that I, CHRISTOPHER D. O'CONNOR, a citizen of the United States, residing at Trojan, in the county of Lawrence and State of South Dakota, have invented a new and useful Nut-Lock, of which the following is a specification.

The present invention appertains to nut locks, and aims to provide a novel and improved device of that character.

It is the object of the present invention to provide a simple and inexpensive means for efficiently locking a nut upon a bolt.

It is also the object of the present invention to provide a device of the character indicated which shall not materially weaken either the nut or the bolt, and which shall permit the nut to be adjusted to various positions along the bolt.

With the foregoing and other objects in view, which will be apparent as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawing, wherein:—

Figure 1 is a side elevation of a bolt and nut, constructed in accordance with the present invention, a portion of the bolt being broken away. Fig. 2 is an end view. Fig. 3 is a sectional view taken on the line 3—3 of Fig. 2. Fig. 4 is a perspective view of a modified form of nut.

In carrying out the present invention, the threaded end of the bolt 1, is formed with a reduced tip or extension 2, and this extension is provided with a slot or kerf 3 extending longitudinally to the end of the bolt proper.

The improved nut 4 embodies the conical or enlarged body 5, the base of the conical body forming the back of the nut, as at 6, and the apex of the conical body 5 having a relatively thin extension or tail 7 of hexagonal or octagonal contour or cross section. The tap of the nut extends completely through the body 5 and tail 7 thereof, so that the nut may be firmly threaded onto the bolt 1. The tail or extension 7 of the nut is provided with a spiral or helical series of transverse or diametrical openings 8 therethrough, the openings being extended through the various sides of the tail, and at various points along the tail. The several openings or apertures 8 are thus disposed angularly with respect to each other, and are spaced longitudinally throughout the length of the tail or extension 7. Thus, the axes of the openings 8 lie in different planes at right angles to the axis of the bolt and none of the axes of the said openings intersect.

A cotter or locking pin 9 is employed for maintaining the nut 4 in position on the bolt, in a manner as will be presently described.

The adjoining openings or apertures 8, through which the cotter pin 9 is adapted to be inserted, are spaced apart longitudinally for a distance slightly shorter than the length of the slot or kerf 3, or it may be said, conversely, that the slot 3 extends longitudinally for a distance slightly greater than the spaces between the respective longitudinally spaced openings 8. As a result of this structure, when the nut 4 is threaded onto the bolt 1, one of the openings 8 will always coincide or register with the slot 3 at the various angular positions of the nut upon the bolt. In this specific instance, the openings 8 are disposed at arcs of sixty degrees with respect to each other, so that the nut may be locked at longitudinal points of approximately one sixth of the thread pitch apart. In this manner, a nicety of adjustment is attained, and as the nut is threaded inwardly, the successive openings or apertures 8 will be successively brought into registration or coöperation with the slot 3. Whenever the nut is threaded sufficiently onto the bolt, the cotter pin 9 may be inserted through the respective opening 8, so as to engage within the slot 3 of the bolt, in which event, the nut will be constrained from turning with respect to the bolt.

The base or back 6 of the body 5 of the nut presents a large bearing surface, so as to eliminate washers, and the tail 7 may be readily clasped by a wrench for turning the nut. The present device also eliminates the employment of a jam nut, or other similar device for locking the nut in position. Attention is directed to the fact that the openings 8 in being disposed in parallel planes along the axis of the nut, instead of being placed in the same or common plane will serve to strengthen the nut, that is, the present nut will not be weakened as would be occasioned by the arrangement of the openings 8 in a common plane. The particular arrangement of the slot and openings of the bolt and nut, respectively, permit the nut to be locked at various positions, so that a considerable adjustment of the nut is possible.

The present invention may also be embodied in a vehicle axle for locking the wheel hub upon the spindle, the axle or its spindle being the equivalent of the bolt depicted in the drawing.

As illustrated in Fig. 4, the nut 4' embodies the conical body 5' having the relatively large base or back 6' and the extension or tail 7' which is relatively short, and only has the three transverse or diametrical openings 8' for the cotter or locking pin. This nut 4' may be locked at the same angular positions upon the bolt, as the nut 4 above described, although the nut 4' has not the latitude of longitude adjustment, as has the nut 4. It will therefore be understood that the nuts may be constructed in various sizes or proportions, as well as the bolts, according to the circumstances.

Having thus described the invention, what is claimed as new is:—

In combination, a bolt having a reduced tip provided with a kerf, a nut comprising an enlarged body having a relatively thin tail of hexagonal cross section and of uniform diameter throughout its length, the nut being tapped from one end to the other and being threaded on the bolt, with the tail disposed over the said reduced tip, the tail of the nut having a spirally arranged series of diametrical openings whereby the axes of the openings lie in different planes at right angles to the axis of the bolt, and whereby none of the axes of the openings intersect, the openings being spaced apart longitudinally slightly less than the length of the said kerf, and a locking pin insertible through the said openings and kerf.

In testimony that I claim the foregoing as my own, I have hereto affixed my signature in the presence of two witnesses.

CHRISTOPHER D. O'CONNOR.

Witnesses:
J. A. JOHNSTON,
W. E. LOWE,